United States Patent

Gancher

[15] 3,691,986
[45] Sept. 19, 1972

[54] GAUGE AND LIGHT SIGNAL

[72] Inventor: Elias Gancher, 477 Farmington Avenue, Waterbury, Conn. 06702

[22] Filed: June 29, 1970

[21] Appl. No.: 50,658

[52] U.S. Cl. .....................116/129, 73/293, 340/366
[51] Int. Cl. .............................................G09f 9/00
[58] Field of Search ......116/118, 129 A, 129, 129 B, 116/116, 129 E, 133, 114, 124; 40/130 K; 73/293, 308, 431, 290; 340/124.79, 244, 266, 366; 33/147; 58/22.7

[56] References Cited

UNITED STATES PATENTS

| | | | |
|---|---|---|---|
| 2,246,849 | 6/1941 | Hough | 116/129 |
| 2,397,971 | 4/1946 | Martinec | 33/147 |
| 3,167,904 | 2/1965 | Wingler | 58/22.7 |

Primary Examiner—Louis J. Capozi
Attorney—William D. Hall, Elliott I. Pollock, Fred C. Philpitt, George Vande Sande, Charles F. Steininger, Robert R. Priddy and Stanley B. Green

[57] ABSTRACT

A gauge is disclosed which provides both an analog indication of a variable quantity and a warning light signal when a danger point is indicated. The face of the gauge includes a slot through which a warning light shines when the danger point is indicated. The slot is located in the vicinity where a conventional pointer would indicate the danger point. Instead of having a conventional slender pointer attached to and rotating on a pinion shaft of a gauge movement, the gauge of the present invention has attached to the pinion shaft a screen in the form of a sector of a circle. The screen subtends an angle at least equal to the entire range of the variable. One edge of the screen is suitably marked as a narrow pointer.

4 Claims, 4 Drawing Figures

PATENTED SEP 19 1972 3,691,986

INVENTOR
Elias Gancher

BY Hall, Pollock & Vande Sande

ATTORNEY

GAUGE AND LIGHT SIGNAL

BACKGROUND OF THE INVENTION

Gauges have long been used to provide a visible indication of a variable quantity. They are particularly useful in the operation of vehicles to monitor a variety of conditions. In the case of automobiles, they have been used to indicate fuel level, water temperature, oil pressure, electrical circuit operation, and many other functions. Experience has shown that inexperienced operators, who do not frequently check the gauge indications, can do severe and costly damage to automobile engines by operating them in unsafe conditions. To prevent this situation, some automobiles are now provided with light signals instead of gauges for some functions. Although this solves some of the problems described above, it introduces still others. For example, when a light indication is used to indicate oil pressure, the automobile operator's attention is rapidly drawn to the emergency condition when the warning light is energized. However, the operator is not forewarned as the oil pressure began to approach an unsafe condition; that is, the signal appears only when the oil pressure has already dropped below the minimum safe level. Prior to reaching this point the operator is not informed that the oil pressure is decreasing. Similar situations exist when light indicators are substituted for gauges monitoring other variables. Of course, it is always possible to provide both gauge and light signal indicators for each of the variables which require monitoring. This solution, however, multiplies the amount of equipment required and does not efficiently utilize the equipment when compared to the present invention.

Therefore, one object of the present invention is to provide a single gauge which provides both an analog signal function in that it indicates the quantity of a variable and also a light signal indication when that variable approaches a danger point.

A further object of the present invention is to provide such a gauge without requiring additional control equipment to operate the gauge.

A further object of the present invention is to provide a gauge which, through a light signal, draws the operator's attention to the gauge when such attention is necessary without requiring additional control equipment to operate the light.

DETAILED DESCRIPTION OF THE DRAWINGS

Figure 1:
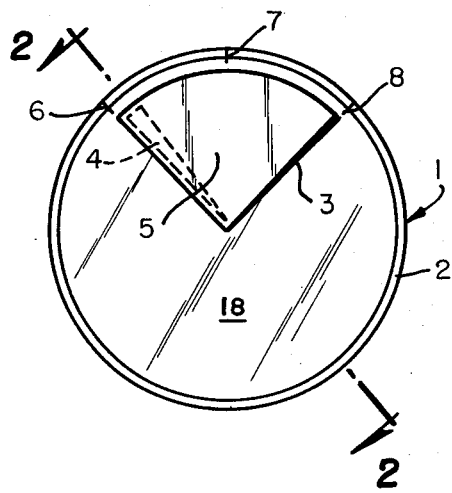
FIG. 1 shows a front view of a gauge embodying the present invention.

FIG. 1 shows a gauge embodying the principles of the present invention. This embodiment could be used to indicate fuel level, for instance. The gauge is indicated at 1. Gauge 1 comprises a face 2 on which is indicated the conventional indicia markings such as the fuel empty indicia at 6, the half full indicia at 7, and the full indicia at 8. In addition, face 2 also includes a narrow slot 4 which could be covered by a translucent red window. Covering face 2 is a screen 5 in the shape of a sector of a circle. Screen 5 subtends an angle which must be at least equal to the angular distance between empty indicia 6 and full indicia 8 and preferably slightly exceeds this distance. The right-hand edge of screen 5 is appropriately marked with pointer 3. Screen 5 could subtend any angle greater than the necessary minimum so long as a sufficient gap is provided to allow light from the slot 4 to pass the screen at the proper time. An annular ring 17 placed at the edge of face 2 and perpendicular thereto cooperates with face 2 to form a housing for the indicator. The housing is closed by a transparent cover 18, as shown in FIG. 1.

Figure 2:
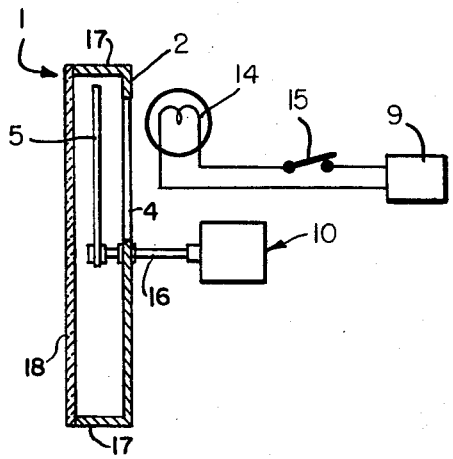
FIG. 2 is a cross-section taken on lines 2—2 of FIG. 1.

FIG. 2 shows a cross-section of the fuel gauge of FIG. 1. In addition to the face 2, screen 5 and slot 4 shown in FIG. 1, FIG. 2 also shows a light source 14 used for illumination purposes. Light source 14 is connected to the vehicle power source 9 through ignition switch 15.

Screen 5 is controlled by conventional gauge mechanism 10 through pinion shaft 16. When the vehicle ignition 15 is closed, light source 14 is illuminated through the obvious circuit shown in FIG. 2. Conventional gauge mechanism 10 controls the screen 5 in accordance with the vehicle fuel level. The right-hand edge of screen 5 forms pointer 3 which indicates the remaining fuel level. Normally light from source 14 is hidden from the operator's view by screen 5 if the remaining fuel level is sufficient to cause pointer 3 to indicate a non-critical fuel level. As fuel is consumed, the conventional gauge mechanism 10 causes rotation of screen 5 along with pointer 3. When the fuel level in the vehicle reaches a predetermined low level, conventional gauge mechanism 10 will have rotated screen 5 through an angle sufficient to uncover slot 4. At this time, the light from source 14 is visible to the operator and his attention is immediately drawn to the analog indication of fuel level on the face of the fuel gauge and thus the condition of the fuel system of the vehicle.

Figure 3:
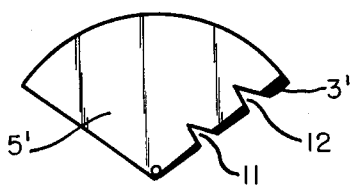
FIG. 3 shows a modification of the screen usable with the gauge of FIG. 1.

FIG. 3 shows an alternative embodiment for screen 5. Screen 5' of FIG. 3 differs from the screen 5 of FIG. 1 in that notches 11 and 12 are provided at the indicator edge of the screen. Although FIG. 3 shows two such notches, it is within the scope of the present invention to use one or more. When screen 5' with notches 11 and 12 is provided with the gauge of FIG. 1, a light signal will be indicated to the vehicle operator prior to the time fuel level reaches an emergency condition. Light signal from source 14 is transmitted to the vehicle operator at an early time through notches 11 and 12. Thus, a prewarning indication is provided.

Figure 4:
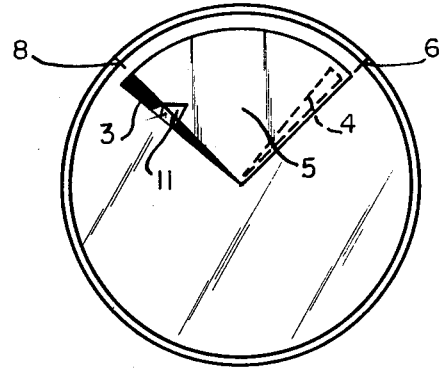
FIG. 4 shows another embodiment of the present invention.

FIG. 1 discloses a gauge embodying the principles of the present invention in which the emergency condition occurs when pointer 3 approaches the extreme left-hand position. It will be apparent to those skilled in the art that the principles of the present invention could be embodied in gauges in which the emergency condition arises when the indicator approaches the extreme right-hand termination of its movement. Gauges of the latter type include temperature gauges for instance. FIG. 4 illustrates a gauge of the latter type employing the principles of the present invention.

In FIG. 4, gauge 1 comprises face 2 which includes a slot 4. Due to the nature of the gauges of this type, slot 4 is located at the extreme right-hand termination of the pointer path. Also in this embodiment, screen 5 includes pointer 3 at its extreme left-hand edge. Screen 5 also includes notch 11 illustrating another use of the prewarning embodiment.

In operation the gauge of FIG. 4 operates in much the same manner as the gauge disclosed in FIG. 1. When the vehicle electrical system is energized, through ignition switch 15, the light source 14 associated with the gauge is illuminated. Assuming, however, that the system being monitored by the gauge is not in an emergency condition at that time screen 5 will be in position to block the illumination from light source 14 from being observed by the vehicle operator. If, during vehicle operation, the system being monitored by the gauge of FIG. 4 approaches an emergency condition screen 5 will be rotated to the right a sufficient amount to allow light from source 14 to be observed by the vehicle operator through the slot 4 and the notch 11 in the screen 5. If no action is taken by the operator and the condition of the system being monitored by the gauge 1 deteriorates, the screen 5 will continue to rotate to the right until such time as the operator will observe light from source 14 directly through slot 4.

The invention has been disclosed with reference to a plurality of types of gauges commonly used in vehicles. The gauge of the present invention will find most promising application in types of vehicles which are ordinarily or commonly driven by inexperienced operators. The vast majority of vehicles of this type would be automobiles. However, the invention is not restricted in scope to use in automobiles or even vehicles. It would be apparent to those skilled in the art that the principles of the present invention can be applied to gauges of almost any type. The principles of the present invention will be particularly useful when a light signal indicating an emergency condition is a desirable feature in a gauge. The present invention is capable of providing such a light signal in gauges of almost any description in a very simple manner as has been described above. It will be apparent that the only additional equipment required is the light source itself. No additional control circuitry is required and standard gauge mechanisms may be used.

And I claim:

1. A gauge for displaying a quantity in analog form and for indicating an emergency condition comprising,
    a gauge mechanism including a rotatable shaft, said shaft rotating in response to a change in said quantity,
    a plate mounted adjacent to said gauge mechanism through which said shaft extends, said plate having at least maximum and minimum indicia thereon on a side of said plate which is not adjacent said gauge mechanism, said maximum and minimum indicia separated by an angular distance to establish a scale for said quantity, said plate further including a slot adjacent one of said maximum or minimum indicia,
    warning light means mounted adjacent said slot and on the same side of said plate as said gauge mechanism,
    rotatable screen means mounted on and rotatable with said shaft, said screen means being adjacent said side of said plate with said indicia thereon, said screen means subtending an angle substantially equal to the angular distance between said maximum and minimum indicia and having a pointer thereon, said pointer cooperating with said indicia to indicate a quantity to be measured by said gauge, said screen means being so mounted on said shaft as to completely cover said slot throughout a predetermined rotation of said shaft and screen means,
    whereby the screen means uncovers said light means when said predetermined amount of rotational movement has been exceeded.

2. A gauge as claimed in claim 1 in which said screen means has leading and trailing edges with said pointer being located at one of said edges.

3. The gauge of claim 2 in which said slot is triangular with two sides extending radially outward from said shaft.

4. The gauge of claim 2 wherein said screen means has at least one notch extending inwardly from one edge of said screen means.

* * * * *